(12) United States Patent
Madison et al.

(10) Patent No.: US 10,650,329 B2
(45) Date of Patent: May 12, 2020

(54) SYSTEM TO FACILITATE PREDICTIVE ANALYTIC ALGORITHM DEPLOYMENT IN AN ENTERPRISE

(71) Applicants: James A. Madison, Windsor, CT (US); Shane Eric Barnes, Avon, CT (US); Tyler L. Kapushinski, New Britain, CT (US); Mohan Subramaniam, Southington, CT (US); Ludwig Steven Wasik, West Hartford, CT (US)

(72) Inventors: James A. Madison, Windsor, CT (US); Shane Eric Barnes, Avon, CT (US); Tyler L. Kapushinski, New Britain, CT (US); Mohan Subramaniam, Southington, CT (US); Ludwig Steven Wasik, West Hartford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 545 days.

(21) Appl. No.: 15/386,134

(22) Filed: Dec. 21, 2016

(65) Prior Publication Data
US 2018/0174056 A1 Jun. 21, 2018

(51) Int. Cl.
*G06Q 10/00* (2012.01)
*G06Q 10/06* (2012.01)
*G06Q 10/04* (2012.01)

(52) U.S. Cl.
CPC ............ *G06Q 10/00* (2013.01); *G06Q 10/04* (2013.01); *G06Q 10/06* (2013.01); *G06Q 10/0637* (2013.01); *G06Q 10/06375* (2013.01)

(58) Field of Classification Search
CPC ........ G06Q 10/00; G06Q 10/04; G06Q 10/06; G06Q 10/0637; G06Q 10/06375
See application file for complete search history.

(56) References Cited

U.S. PATENT DOCUMENTS

| | | | |
|---|---|---|---|
| 8,688,752 | B2 | 4/2014 | Solovey et al. |
| 8,886,654 | B2 | 11/2014 | Agrawal et al. |
| 8,904,341 | B2 | 12/2014 | Edwards et al. |
| 9,460,395 | B2 | 10/2016 | Baker |
| 2009/0106178 | A1 | 4/2009 | Chu |

(Continued)

OTHER PUBLICATIONS

Pesaran et al, A Recursive Modlling Approach to Predicting UK Stock Returns, 2000, The Economic Journal (Year: 2000).*

*Primary Examiner* — Austin Hicks
(74) *Attorney, Agent, or Firm* — Buckley, Maschoff & Talwalkar LLC

(57) ABSTRACT

According to some embodiments, an analytics computing environment data store may contain a set of electronic data records, each electronic data record being associated with a predictive analytic algorithm and including an algorithm identifier and a set of algorithm characteristic values. An analytics environment computer may receive an adjustment from a user associated with an enterprise, the adjustment changing at least one of the set of algorithm characteristic values for a predictive analytic algorithm. Deployment of the predictive analytic algorithm may then be initiated in an enterprise operations workflow and at least one result may be generated. The deployed predictive analytic algorithm may then monitor the result and generate an alert signal when the result exceeds a boundary condition.

16 Claims, 17 Drawing Sheets

(56) References Cited

U.S. PATENT DOCUMENTS

| | | |
|---|---|---|
| 2013/0332241 A1 | 12/2013 | Taylor |
| 2015/0142726 A1 | 5/2015 | Taylor |
| 2015/0206246 A1* | 7/2015 | Lange .................... G06Q 40/06 705/36 R |
| 2016/0034819 A1 | 2/2016 | Murthy et al. |
| 2016/0350671 A1 | 12/2016 | Morris, II et al. |

* cited by examiner

SYSTEM TO FACILITATE PREDICTIVE ANALYTIC ALGORITHM DEPLOYMENT IN AN ENTERPRISE

BACKGROUND

In some cases, an enterprise might want to analyze, model, and/or predict performance values. For example, a business might want to predict a likelihood of a future event occurring based on a number of different factors. Typically, a user associated with the enterprise may manually define rules and/or logic to implement such predictions. These rules and/or logic can then be tested before being deployed for use by the enterprise. Such an approach, however, can be a time consuming and error-prone process—especially when the logic being implemented for an algorithm is complex and/or a substantial number of factors are associated with the prediction.

It would be desirable to provide systems and methods to accurately and efficiently facilitate predictive analytic algorithm deployment for an enterprise, while allowing for flexibility and effectiveness when creating, reviewing, and/or monitoring algorithms as appropriate.

SUMMARY OF THE INVENTION

According to some embodiments, systems, methods, apparatus, computer program code and means are provided to facilitate predictive analytic algorithm deployment for an enterprise. In some embodiments, an analytics computing environment data store may contain a set of electronic data records, each electronic data record being associated with a predictive analytic algorithm and including an algorithm identifier and a set of algorithm characteristic values. An analytics environment computer may receive an adjustment from a user associated with an enterprise, the adjustment changing at least one of the set of algorithm characteristic values for a predictive analytic algorithm. Deployment of the predictive analytic algorithm may then be initiated in an enterprise operations workflow and at least one result may be generated. The deployed predictive analytic algorithm may then monitor the result and generate an alert signal when the result exceeds a boundary condition.

Some embodiments comprise: means for receiving, by an analytics environment computer, data from an analytics computing environment data store containing a set of electronic data records, each electronic data record being associated with a predictive analytic algorithm and including an algorithm identifier and a set of algorithm characteristic values; means for receiving, by the analytics environment computer, an adjustment to at least one of the set of algorithm characteristic values from a user associated with the enterprise; means for initiating deployment of the predictive analytic algorithm in an enterprise operations workflow; and means for executing, by an enterprise operations workflow computer, an operations workflow in association with the deployed predictive analytic algorithm to generate at least one result, wherein the deployed predictive analytic algorithm is to monitor the result and generate an alert signal when the result exceeds a boundary condition.

In some embodiments, a communication device associated with a back-end application computer server exchanges information with remote devices. The information may be exchanged, for example, via public and/or proprietary communication networks.

Some technical effects of some embodiments of the invention are improved and computerized ways to accurately and efficiently facilitate predictive algorithm deployment for an enterprise. With these and other advantages and features that will become hereinafter apparent, a more complete understanding of the nature of the invention can be obtained by referring to the following detailed description and to the drawings appended hereto.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of one or more electronic data record management and deployment by providing benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third party systems, networks and subsystems. For example, in the present invention information may be processed, managed, and/or used to deploy predictive analytic algorithms, such as by deploying and/or using computing components, and results may then be analyzed accurately and used to fine tune the algorithms, thus improving the overall performance of an enterprise (e.g., by improving the effectiveness and/or reducing the number of algorithms that need to be processed via a network and/or communication links). Moreover, embodiments might further improve performance values, response times, resource allocation decisions, etc.

In some cases, an enterprise might want to analyze, model, and/or predict performance values. For example, a business might want to predict a likelihood of a future event occurring based on a number of different factors (e.g., how likely is it that a potential customer will eventually purchase a product?). Typically, a user associated with the enterprise (e.g., a data scientist) may manually define rules and/or logic to implement such predictions. These rules and/or logic can then be tested before being deployed by the enterprise. Such an approach, however, can be a time consuming and error-prone process.

Figure 1:
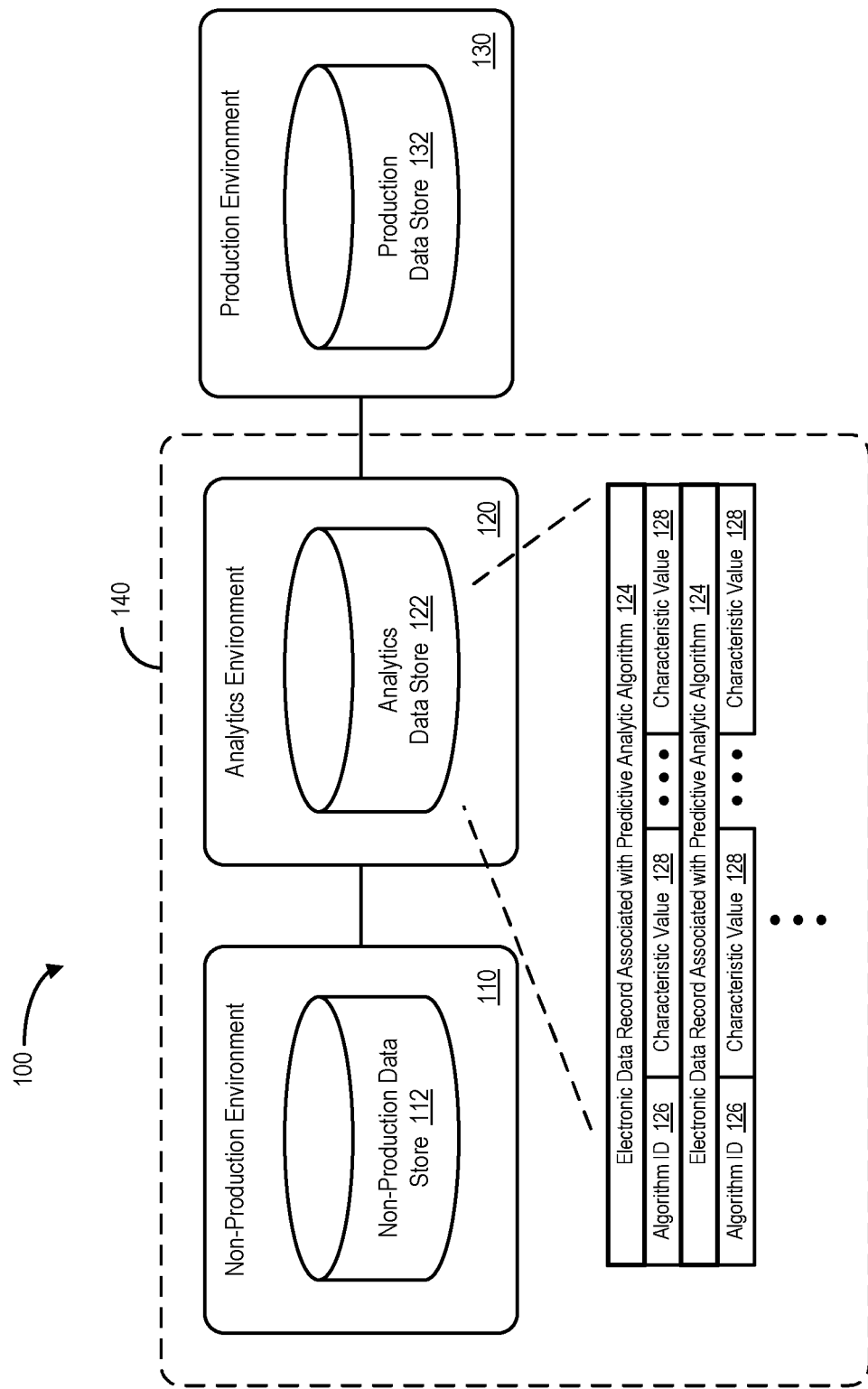
FIG. 1 is a high-level block diagram of an enterprise system according to some embodiments.

It would be desirable to provide systems and methods to accurately and efficiently facilitate predictive analytic "algorithm" deployment for an enterprise, while allowing for flexibility and effectiveness when creating, reviewing, and/or monitoring algorithms as appropriate. As used herein, the term "algorithm" may refer to, for example, a process or set of rules to be followed in calculations or other problem-solving operations (e.g., by a computer) and/or any coding, software, networking, APIs, predictive models, predictive model metadata, predictive model hyper-parameters, other system components, etc. FIG. 1 is a high-level block diagram of a system 100 according to some embodiments of the present invention. In particular, the system 100 includes a non-production environment 110 with a non-production data store 112 and a production environment 130 with a production data store 132. According to some embodiments, the system 100 further includes an analytics environment 120 and an analytics data store 122.

Note that the analytics environment 120 (and/or other components of the system 100) may also exchange information with a remote user terminal (e.g., via a firewall). According to some embodiments, a back-end application computer server and/or the remote user terminal may facilitate viewing, receiving, and/or interacting with data about predictive analytic algorithms. Moreover, a central repository (not illustrated in FIG. 1) might be used to store the results of such algorithms. According to some embodiments, the analytics environment 120 (and/or other devices described herein) might be associated with a third party, such as a vendor that performs a service for an enterprise.

The analytics environment 120 and/or other devices described herein might be, for example, associated with a Personal Computer ("PC"), laptop computer, smartphone, an enterprise server, a server farm, and/or a database or similar storage devices. According to some embodiments, an "automated" analytics environment 120 may facilitate an automated deployment of a predictive analytic algorithm based on electronic data records in the analytics computer store 110. As used herein, the term "automated" may refer to, for example, actions that can be performed with little (or no) intervention by a human.

As used herein, devices, including those associated with the analytics environment 120 and/or any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The analytics environment 120 may store information into and/or retrieve information from the analytics data store 122. The analytics data store 122 might, for example, store electronic records associated with various analytic algorithm components 124, including, for example, algorithm identifiers 126 and component characteristic values 128 (e.g., associated with inputs, outputs, business rules or logic, etc.). The analytics data store 122 may be locally stored or reside remote from the analytics environment 120. As will be described further below, the analytics data store 122 may be used by the analytics environment to help deploy and manages algorithms for an enterprise. Although a single analytics environment is shown in FIG. 1, any number of such devices may be included. Moreover, various devices described herein might be combined according to embodiments of the present invention. For example, in some embodiments, non-production environment 110 and/or analytics environment 120 might be co-located and/or may comprise a single apparatus (as illustrated by the dashed line 140 in FIG. 1).

Traditionally, a non-production environment 110 may be relatively flexible but insecure as compared to a production environment 130. According to some embodiments, the analytics environment 120 may provide a specific combination of other two types of environments 110, 130 (e.g., by using data security associated with production, and table creation, code writing, and other "object rights" of development). An analytic environment 120 may help serve those doing business analytics, such as those in a data science role. Business analytics might be associated with, for example, statistical analysis (why is something happening?), forecasting (what if current trends continue?), predictive modeling (what will happen next?), and/or optimization (what is the best way to proceed?). The analytic environment 120 may give users performing analytics and data science the usability, algorithms, compute power, storage capacity, data movement, and community enablement needed to be successful. According to some embodiments, large-scale enterprise operations may incorporate self-tuning, automated predictive analytics founded on end-to-end data quality using a unified self-service architecture.

Note that data scientists may produce predictive analytics models that let an enterprise, such as an insurance operation, take on risk based on possible future losses. Such predictions may traditionally be done on systems that are largely disconnected from the operational systems where customers are found, business is written, and/or profit is made. Moving predictive models from data science workflows to operations workflows traditionally takes many months; commonly over a year for sufficiently large business problems that impact a large portion of a book of business. Some embodiments described herein make the flow between the two workflows in real-time or substantially real-time.

Figure 2:
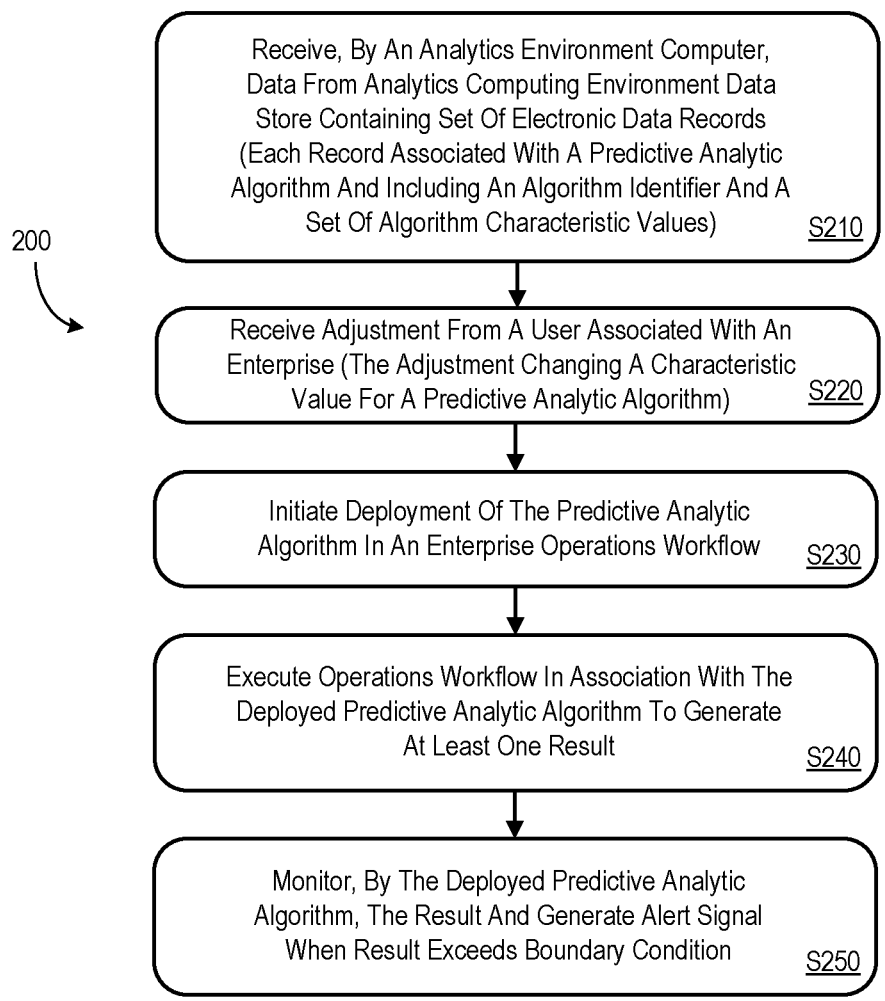
FIG. 2 illustrates an automated predictive analytic algorithm deployment method according to some embodiments.

The system 100 of FIG. 1 is provided only as an example, and embodiments may be associated with additional elements or components. According to some embodiments, the elements of the system 100 may automatically facilitate deployment of predictive analytic algorithms for an enterprise. For example, FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, an analytics environment computer may receive data from an analytics computing environment data store. For example, the received data may be a set of electronic data records, each electronic data record being associated with a predictive analytic algorithm and including an algorithm identifier and a set of algorithm characteristic values. At S220, the analytics environment computer may receive an adjustment to at least one of the set of algorithm characteristic values from a user associated with the enterprise. For example, a user might change an input, output, business logic, etc. via an interactive graphical interface. At S230, deployment of the predictive analytic algorithm is initiated in an enterprise operations workflow. At S240, an enterprise operations workflow computer may execute an operations workflow in association with the deployed predictive analytic algorithm to generate at least one result. According to some embodiments, the result may be used to automatically adjust at least one operating parameter of the deployed predictive analytic algorithm (e.g., to fine-tune the algorithm and improve performance for the enterprise). At S250, the deployed predictive analytic algorithm may monitor the result and generate an alert signal when the result exceeds a boundary condition. The alert signal might, for example, be automatically transmitted to a user (or a role) for further investigation. The boundary condition might comprise, for example, a minimum threshold value, a maximum threshold value, a condition associated with a series of results, etc. that indicate the algorithm may not be operating as intended.

Figure 3:
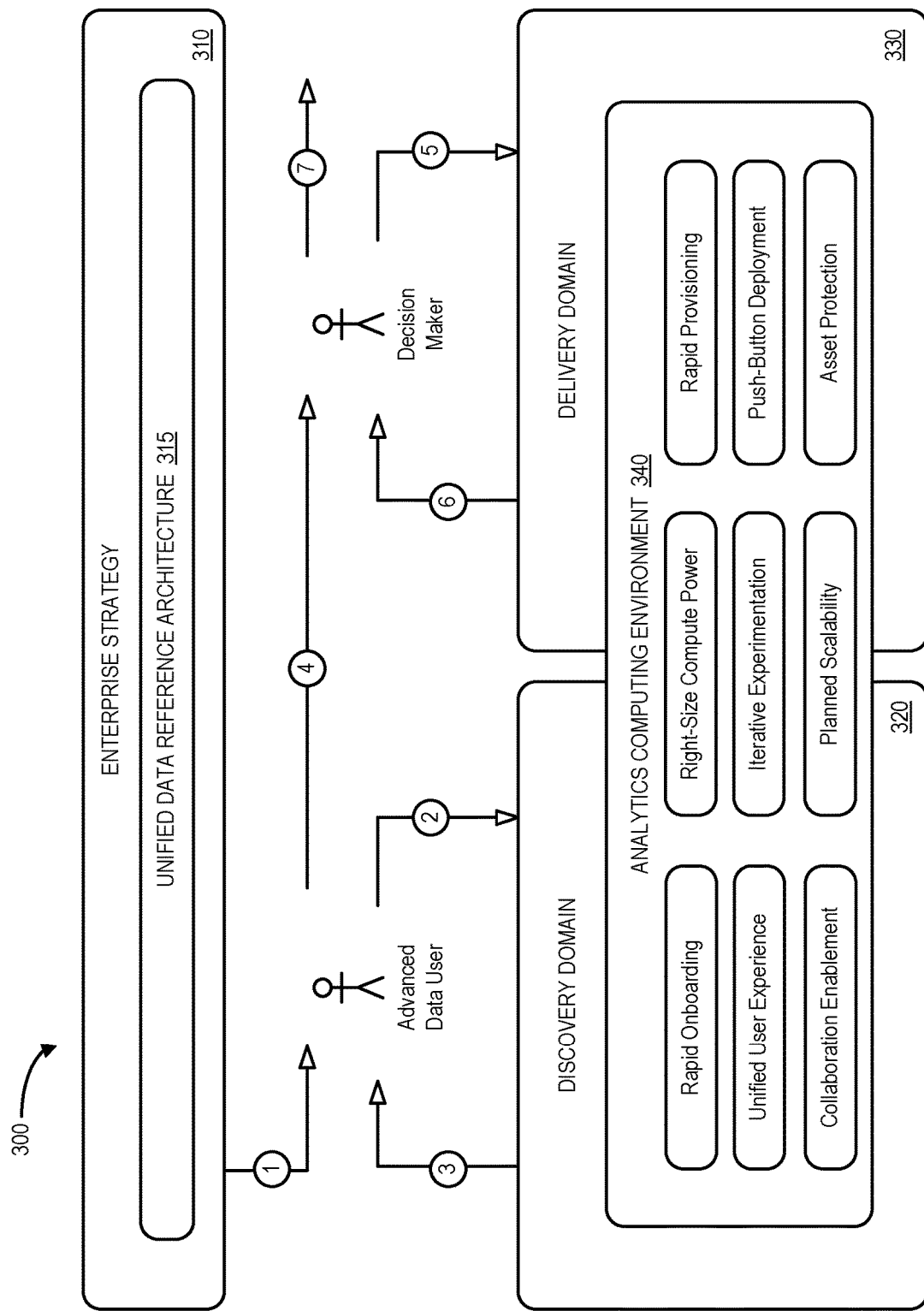
FIG. 3 illustrates an analytics computing environment in context in accordance with some embodiments.

FIG. 3 illustrates an analytics computing environment 300 in context in accordance with some embodiments. The environment 300 includes an enterprise strategy 310 (e.g., including a unified data reference architecture 315). Note that the environment 300 may be the foundation of a discovery domain 320 (e.g., publication, entitlements, visualization, policies, etc.), where business ideas may be shown to have value, and provide a direct path to a delivery domain 330 (e.g., enterprise data warehouse, production workflows, etc.), where ideas become actions. In particular, an analytics computing environment 340 (e.g., associated with value proposition, working areas, defined tooling, etc.) may help with that transition. According to some embodiments, the analytics computing environment 340 may include rapid onboarding, a unified user experience, collaboration enablement, appropriate compute power, iterative experimentation, planned scalability, rapid provisioning, push-button deployment, and/or asset protection.

At (1), a mission may be provided form the enterprise strategy 310 to an advanced data user. The advanced data user may then provide a hypothesis to the discovery domain 320 at (2) and receive knowledge at (3). This process may be repeated until the advanced data user indicates a value to a decision maker at (4). The decision maker may then provide questions to the delivery domain at (5) and receive answers at (6). As a result of the answers, the decision maker can initiate an action at (7).

Figure 4:
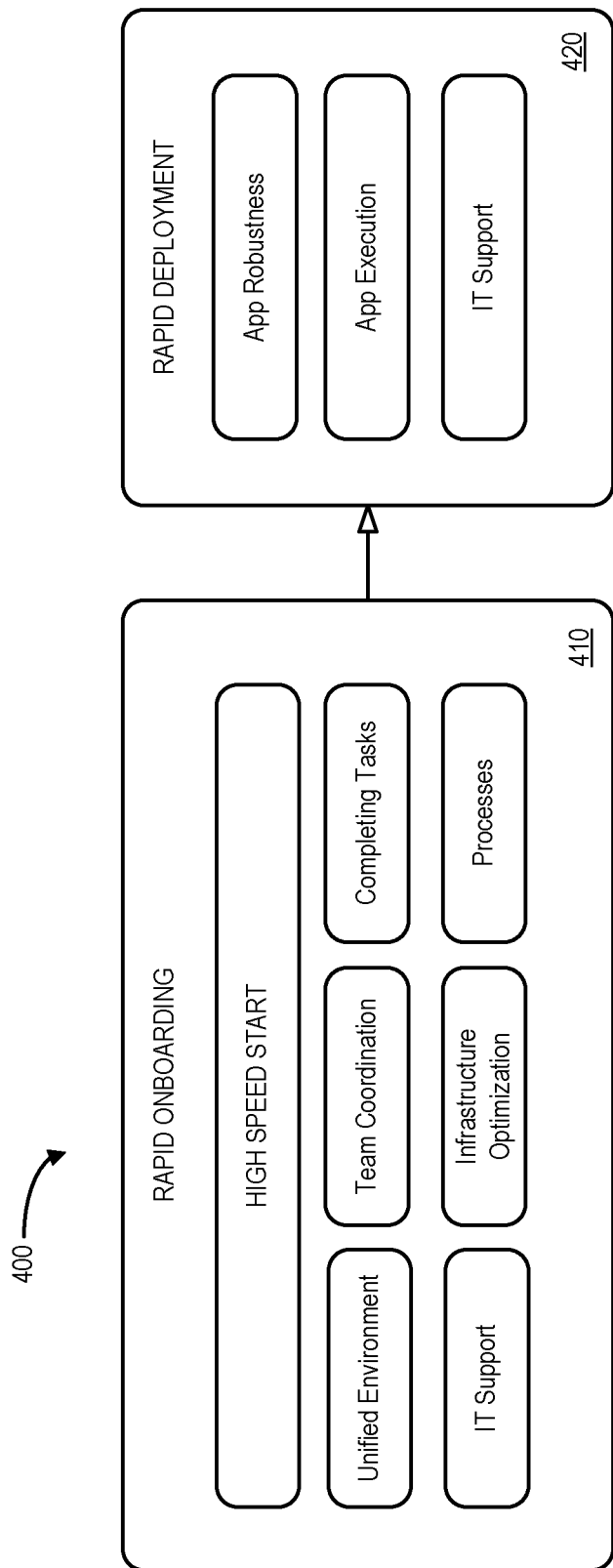
FIG. 4 illustrates an analytics computing environment process according to some embodiments.

FIG. 4 illustrates an analytics computing environment process 400 according to some embodiments. In particular, the process 400 includes rapid onboarding 410. The rapid onboarding 410 might be associated with, for example, a high speed start (e.g., via a one-stop self-service site and everything-to-everything connectivity), a unified environment (common functions, common profiles, common shells, etc.), Information Technology ("IT") support (e.g., broad system authority, cross-server automation, a standardized server build, etc.), team coordination (e.g., collaboration enablement, data version control, automated source control, and/or default source control), infrastructure optimization (e.g., self-service space use, resource capping, application containers, entry point rationalization), completing tasks (e.g., pre-build tools, self-service scheduling, pre-allocated groups), and/or processes (e.g., standardized support, standardized notification, self-service personally identifiable information process). The process 400 also includes rapid deployment 420 that might be associated with, for example, app robustness (e.g., regression test apps, regression test data sets, etc.), app execution (e.g., a self-service dashboard, location decoupling, environment consistency, direct app deployment, etc.), and/or IT support (e.g., associated with broad read authority, controlled app deployment, etc.).

Figure 5:
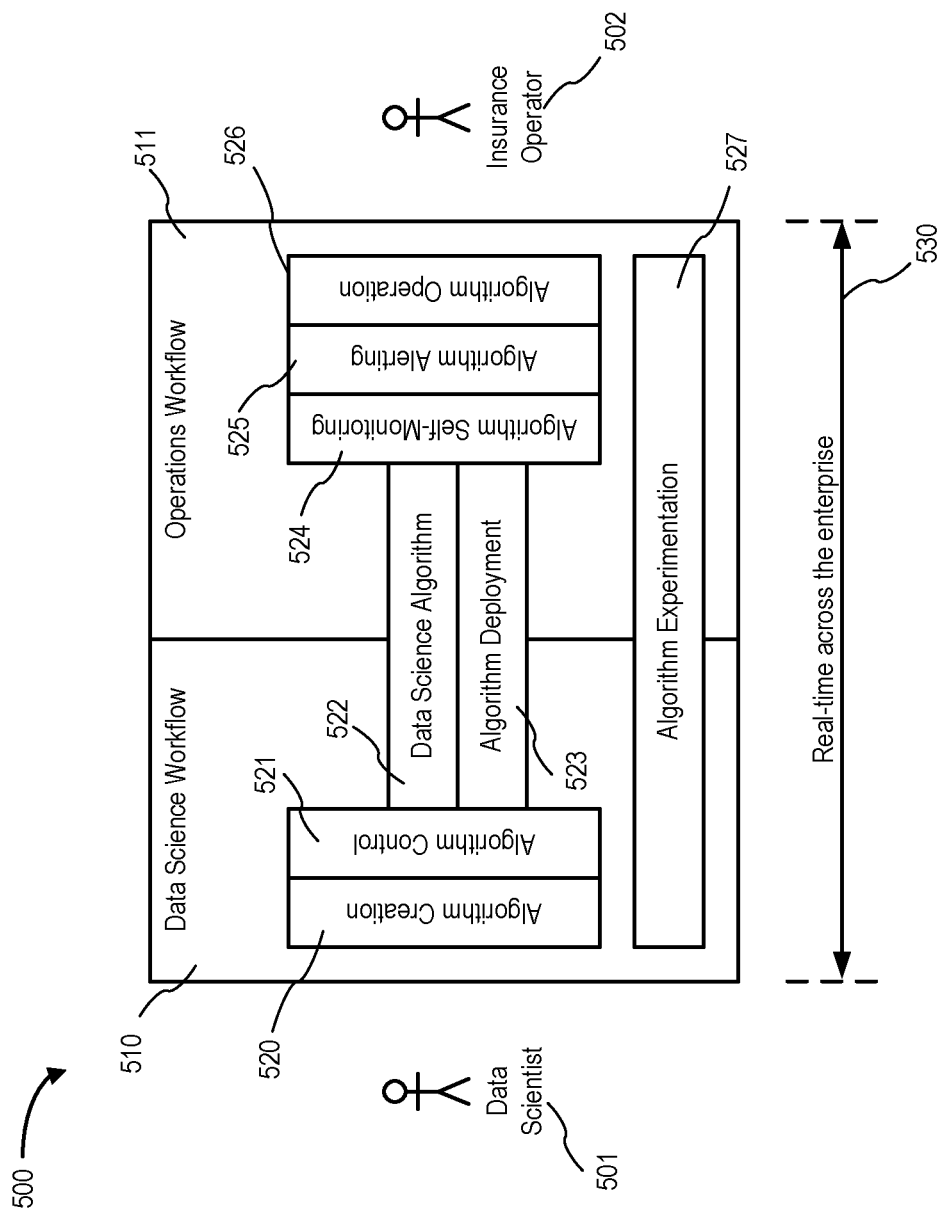
FIG. 5 is an analytics computing environment business process in accordance with some embodiments.

FIG. 5 is an analytics computing environment business process 500 in accordance with some embodiments. In particular, FIG. 5 illustrates a connection between a data science workflow 510 and an operations workflow 511. Some embodiments described herein may provide substantially real-time enterprise data science operations for an enterprise, such as an insurance enterprise. Note that an insurance enterprise might want to inject data science algorithms directly into enterprise workflows in a real-time manner at an enterprise scale, yet still maintain sufficient auditing and controls inherent in the nature of insurance operations. Such auditing and controls might include, for example, filing rates with insurance offices, compliance with federal laws such as Sarbanes-Oxley, etc. Moreover, embodiments may provide an ability for users in a data science role to discover insights in data using algorithms typically considered predictive in nature (such those related as statistics, data mining, optimization, etc.). For example, embodiments may let data scientists create controls for the algorithms that allow for the operations of the algorithms within a broader enterprise systems environment. Such controls might be, for example, given to the data scientist (instead of a third party, such as a technology department, as is often needed in traditional designs). Embodiments may provide a channel for rapid deployment of algorithms into a location in the enterprise system that allows for use by production operations. Such deployment might include, for example, automated automation and version tracking sufficient to meet audit requirements inherent in the insurance industry. The real-time or substantially real time systems might include underwriting operations, call center operations, Web site operations, etc. Note that such algorithms might be integrated into larger operational systems or may stand-alone.

As used herein, the phrase "data scientist" 501 might refer to, for example, any system user who does non-trivial mathematical operations on data (e.g., operations using algebra, calculus, linear algebra, statistical analysis, optimization methods, and similar mathematical approaches). The data science 501 role as used herein may include one person or many such people. As used herein, the phrase "insurance operator" 502 might refer to, for example, any person whose job is to work within the operations workflow 511, typically on software systems that contain a data science algorithm 522. According to some embodiments, the data science algorithm 522 may be embedded into the enterprise systems in a way that makes algorithm operations 526 transparent to such users. The insurance operator 502 role as used herein may include one person or many such people.

The data science workflow 510 might be associated with a process by which a data scientist 501 does the work of applying mathematics to data to find data science algorithms 522 of sufficient interest to the enterprise to warrant putting them into the operations workflow 511. The data science workflow 510 may include activities related to readying the data science algorithm 522 for use in the operations workflow 511. Such readiness might include many activities that may vary by the nature of the algorithm or the operations workflow 511 into which the algorithm is deployed. Examples of such activities might include creating a consistent interface, defining algorithm control 521 parameters, and automating activities that would traditionally have been done manually by the data scientist 501 were it not for the real-time or near real time actions end-to-end required by the enterprise. Creating a consistent interface may include creating such software elements as are required for the operations workflow 511 software systems to call the data science algorithm 522 in a manner stable enough for predictable algorithm operation 526.

The operations workflow 511 may refer to aspects of the business process supported by one or more software systems that allow the insurance operator 502 to perform normal responsibilities. The operations workflow 511 may, according to some embodiments, have functionality needed to call the data science algorithm 522 that have been defined to have proper algorithm control 521. Examples of allowing for such integration is the operations workflow 511 systems having standardized calling mechanisms such as those based in REST or WS-*protocols. Given that operations workflows 511 are typically embodied in systems built by enterprise IT departments, this type of functionality is commonly incorporated.

Algorithm creation 520 may refer to aspects of the process whereby the data scientist 501 uses mathematical activities on data to find insights for the business which can then be embodied in data science algorithm 522. According to some embodiments, the algorithm creation 520 may establish a location in the environment that is uniform across multiple adapted system components 603 for both the community of those in the data scientist 501 role and for systems across both the data science workflow 510 and operations workflow 511 (as described with respect to FIG. 6).

Algorithm control 521 may refer to aspects of the process whereby the algorithm is embedded in software that has the properties and behaviors needed to function in a stable and repeatable manner in the operations workflow 511. While this is often a contribution of a traditional IT department, engaging such a department may be too slow for an enterprise real-time or substantially real time use of the data science algorithm 522 in operations workflows 511. Instead, such readiness of the data science algorithm 522 and its embodying software may become the responsibility of the data scientist 501. Note that such tasks are traditionally thought of generally as software engineering. Some embodiments described herein may create systems and methods to make the data scientist 501 successful enough at such tasks to meet the demands of the systems that embody the operations workflow 511 (without taking too much away from the algorithm creation 520 work that is the core to the business value proposition of the data scientist 501). Moreover, embodiments may utilize a series of practices that enable efficient achievement of algorithm control. The artifact of such practices may be produced by one or more technology engineers 601 (described with respect to FIG. 6) who know which practices are needed to meet the goals of algorithm control 521, algorithm deployment 523, algorithm self-monitoring 524, algorithm alerting 525, and algorithm operation 526, but are required to publish such practices in a form usable at the more limited software engineering skill level of the data scientist 501. Such practices might include, for example:

1) Use of environmental variables. Relatively low-skill code writers (which data scientists 501 tend to be because it is not their primary skill set) may put physical locations in code. That can result in errors when the code is moved to a different location. The data scientists 501 may be taught to decouple from the physical environment with environmental variables.

2) Time-independent logic. Relatively low-skill code writers may use the system clock, or otherwise assume "today" when doing date logic. This fails when something causes a time disruption, such as a batch job running a day late. The data scientists 501 may be taught to store and reuse the last processed date.

3) Error handling. Relatively low-skill code writers tend to use system failure as an error handling mechanism—if it fails, then address it. This is rarely acceptable in the operations workflow 511. Instead, the data scientists 501 may be taught to do error handling such as try-catch logic common in many programming languages.

Such practices may be published, evolved, and worked on collaboratively between the data scientist 501 and the technology engineer 601 as a recurring process. Each of these software engineering practices (and similar ones) might be obvious to software professionals who are technology engineers 601 by trade. However, taken as a series of standardized practices for those in a data scientist 501 role, these practices may constitute a method to allow data scientists to embody their data science algorithm 522 in software that works correctly and reliably in operations workflows 511. Moreover, algorithm deployment 523 and algorithm operation 526 may now meet the real-time or substantially real-time actions end-to-end 530 to achieve an enterprise business value proposition.

A data science algorithm 522 may refer to aspects of the data science product that takes as input one or more data attributes for one or more data records and produces as output some indication of the relationship of those records to a predicted attribute of interest to the business. This may include, for example, the strict definition of an algorithm: "a process or set of rules to be followed in calculations or other problem-solving operations, especially by a computer." The phrase may also include any coding, software, networking, application programming interfaces, predictive models, predictive model metadata, predictive model hyper-parameters, or other system components or functionality to gather, move, deliver, or deploy such functionality in an enterprise environment across either data science workflow 510 or operations workflow 511.

Algorithm deployment 523 may refer to aspects of getting the components that embody the data science algorithm 522 into the operations workflow 511. Some embodiments may collect the components into a single deployable unit that can be moved to the systems of the operations workflow 511.

The components in their deployable unit may be given a version number so that they can be tracked, but also promoted and demoted in the algorithm experimentation 527 process. Several algorithm deployment 523 methods may be available, but at least one may automatically version control the release on a different server over which the data scientist 501 does not have control. Such remote, locked-down source control might help, for example, meet insurance audit requirements for systems.

Algorithm self-monitoring 524 may refer to aspects of the deployed embodiment of the algorithm's ability to understand its own state, or report it state to either a data scientist 501 or an insurance operator 502 for user intervention as needed. Such monitoring may include, for example, simple notions such as proper operation, but may also include any aspect of algorithm operation that is integral to the business such as dangerous outlying conditions occurring, or values moving outside of expected norms. Regardless of the particular monitoring that occurs, an algorithm has been coded by the data scientist 501 may know its critical conditions, and embodiments may let the algorithm conduct such self-monitoring. An example might include an algorithm binning its output into deciles over time and knowing that a condition of interest has occurred when any bin is some percentage outside its normal trend. Such monitoring algorithms tend to be reusable across algorithms, therefore the frequently used monitoring algorithms might be generalized and stored in a reusable components 624 library (described with respect to FIG. 6).

Algorithm alerting 525 may refer to aspects of notifying the data scientist 501, insurance operator 502, or technology engineer 601 when some algorithm self-monitoring 524 event becomes a condition of interest. Operations workflows 511 might have, according to some embodiments, highly engineered alerting mechanisms in place as these are critical to traditional technology operations. The algorithm alerting design connects the deployed data science algorithm 522 into the operations workflow 511 by using the interface design of the algorithm control 521. With that connection, the algorithm self-monitoring 524 may trigger the alerting mechanisms in the operations workflow 511. Such triggered alerts can then be sent to the data science workflow 510. Note that a data science workflow 510 typically does not have the level of rigor associated with the operations workflow 511. Such rigor is not necessary because the data science workflow 510 can use something as simple as email to receive the alerts. According to other embodiments, the data science workflow 510 has specialized alerting dashboards for the data scientist 501.

Algorithm operation 526 may refer to aspects of executing the data science algorithm 522 in its software embodiment in the operations workflow 511. This might include, for example, the processing of any record of data with the input attributes and producing the scoring values that are the very purpose of the model. Such operation may also include performing algorithm self-monitoring 524 and algorithm alerting 525 as the operation of the algorithm occurs.

Algorithm experimentation 527 may refer to aspects of data science algorithm 522 experiments that are enabled across an enterprise as a result of previously described functionality. That is, is may become possible to move from algorithm creation 520 to algorithm operation 526 at real-time speeds with the security required in insurance operations (and with the stability needed for enterprise systems). As the data scientist 501 is given charges to find predictive insights, and then finds them, the data scientist may then get them to the job of the insurance operator 502 as fast as possible. The system may tracks the version control number across all platforms. The algorithm self-monitoring 524 and algorithm alerting 525 may track the metrics of the experiment. The algorithm deployment process 523 may allow for the rapid redeployment of new algorithms as algorithm operations 526 provide new information. These may then be combined with several new elements of experimentation design. The system may allow for multiple versions of an algorithm to be in place in the operations workflow 511 at any one time, and for the systems of the operations workflow 511 to choose among them for comparison. This is similar to "A/B testing" of a more traditional system (such as web page variations). The system may also allow for algorithm section between the several deployed models. This model selection can be done via manual involvement by the data scientist 501 or the insurance operator 502, but it can also be selected by the model itself, for example when the model detects for itself based on algorithm self-monitoring 524 that some version of itself is performing better than others. When a model self-selects, it may then let the data scientist 501 or insurance operator 502 know via algorithm alerting 525.

Real-time actions across the enterprise 530 may refer to aspects getting previously described elements to perform their function at the required speed and system scale. The constraint of real-time and requiring that all functions span across the many systems that occur in an enterprise, may refer to the literal definition of "real-time" in the sense that the algorithm self-monitoring 524 can produce algorithm alerting 525 that is fed directly into algorithm operation 526 such that the data science algorithm 522 immediately alters its behavior in a system context with no intervention by any user. Real-time herein shall be taken to include any short period of time needed for the system to alter a user in a role, for that user to apply judgment, then for that user to allow the system to execute an action. Fifteen minutes is one example of a substantially real-time response. That which is not real-time or substantially real-time is typically referred to as "batch." Note that any of the embodiments described herein might utilize batch or micro-batch operations (the use of batch operations so small they appear real-time or near-real time). As used herein, the term "enterprise" may refer to the systems of an organization that embody execution of business operations in software. This might include, for example, one or more software systems, where the engineering to handle handling of dozens of such systems in real-time may be a requirement of the business.

Figure 6:
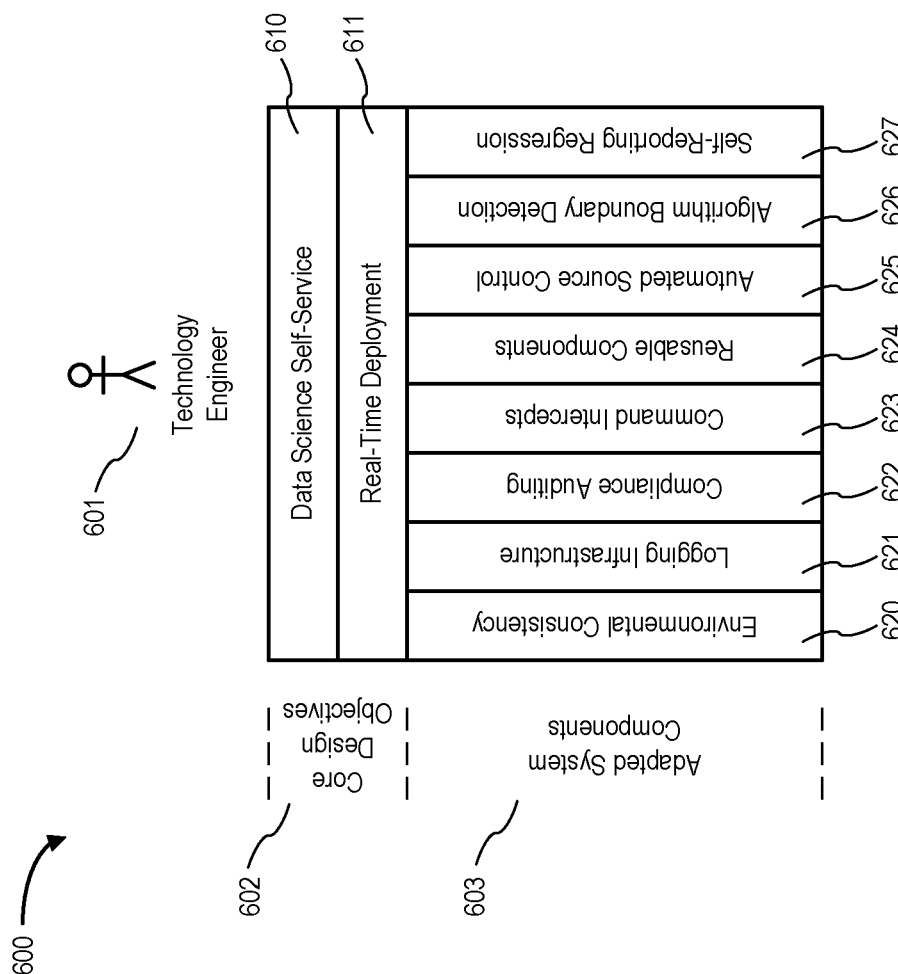
FIG. 6 is an analytics computing environment technical architecture according to some embodiments.

FIG. 6 is an analytics computing environment technical architecture 600 according to some embodiments. In particular, FIG. 6 illustrates components that might embody a system that is visible to the data scientist 501 and insurance operator 502 roles. Such components may be engineered in a manner that gives the data scientist 501 more direct control in achieving the elements of the business process 500, ultimately landing in the operations workflow 511 that enables real-time actions across the enterprise 530.

As used herein, the phrase "technology engineer" 601 might refer to, for example, the role of creating the components that create the system behavior needed to allow the business functions detailed in the business process 500. The skills of the role may create the environment and provide the support of enabling the data scientist 501 to deliver algorithms. A non-limiting example includes submitting work to a server cluster with very user-friendly commands. Such clusters may be very complex to manage, and often have specific constraints about which network cards to communicate over, how much memory to allocate, which work queue to run in, etc. In this example, the technology engineer 601 staff may produce a Linux shell script that figured these and similar things out on behalf of the user without his or her knowledge of cluster complexity. The technology engineer 601 role as used herein may include one person or many such people.

Core design objectives 602 may provide clarity into the motivation for creating the several adapted system components 603 and is used only for reference here. Adapted system components 603 may refer to aspects to facilitate both the core design objectives 602 and, in turn, the business functionality of the business process 500. The adapted system components 603 may be system components in the most traditional sense—software embodiments that are an integral part of an enterprise system. The adaptations may require the technology engineer 601 to consider the core design objectives and the functionality of the business process 500, and engineer a solution associated with the various elements described with respect to FIG. 6.

Data science self-service 610 may refer to aspects of requiring that the technology engineer 601 build system components that allow the data scientist 501 to perform the work of the business process 500 using their own skills and through direct access and control of the system rather than the more traditional approach of giving requirements to the technology engineer 601 and letting the team of technology engineering staff produce the systems and methods to embody the data science algorithm 522 and the surrounding business process 500. The data scientist 501 is assumed to a reasonably good ability to write basic computer code, but is not assumed to have the skills of a software engineer. Basic computer code may include such things as file operations, control statements such as "for" loops, and basic error handling (but not such things as advanced error handling, object-oriented design, notions of generalization and reusability, etc.). The data science self-service 610 core design objective 602 may be implemented, for example, using back-end application computer servers and other devices that will improve the productivity of the data scientist 501 team.

Real-time (or substantially real-time) deployment 611 may refer to aspects of moving the embodiment of the data science algorithm 522 in computer code from the data science workflow 510 to the operations workflow 511 such that all components integrate smoothly with the other elements within the operations workflow 511. One example of such deployment is simply giving the data scientist 501 team File Transfer Protocol ("FTP") access from the servers where data science workflow 510 takes place to the servers where operations workflow 511 takes place. A more advanced example of such deployment is the creation by the technology engineer 601 of scripts that automatically source control all code safely in an enterprise repository, and use advanced system rights not within the control of the data scientist 501 to move the components to the systems in the operations workflow and perform all such compilation, configuration, or other setup work as needed to make the data science algorithm 522 work in the production workflow 511. The real-time deployment 611 core design objective 602 may be implemented, for example, using back-end application computer servers and other devices to let an enterprise rapidly take advantage of the work of the data scientist 501 team.

Environmental consistency 620 may refer to aspects of ensuring that both insurance operators 502 and system components of the technical architecture 600 can be guaranteed that no matter where in the business process 500 or technical architecture 600 is placed, the environment is orthogonal. This includes such things as taking over the centralized environmental login scripts of the operating system and programming languages, ensuring that files always have the same paths available, aliasing database names in ways that don't change even if the host computer does, and similar constructs commonly known as "indirection" in computer science theory. Such constructs may be oriented around the productivity experience of the data scientist 501 working in a context that requires performing the given business process 500 in real-time across the enterprise 530. For example, where traditional software may assume either a technology engineer 601 who has technical skills (and can see the inner workings) or an insurance operator 502 who has business skills (and cannot see the inner workings), the environment assumes that the data scientist 501 is a hybrid that has business skills and can see the inner workings. To address this, the technology engineer 601 may build components into the reusable components 624 library that result in system commands and controls that automate and simplify large portions of the data science workflow by creating environmental consistency 620, but do not create a fully completed system (and instead require the data scientists 501 to use those consistent components as part of their algorithm creation 520 and algorithm control 521 work).

Logging infrastructure 621 may refer to aspects of the allowing any component of the business process 500 or technical architecture 600 to communicate with any other component to achieve any goal of the system that can only be achieved through the interaction of two more components. The most native layer of such a framework will use technologies commonly known as message queuing or an enterprise service bus. Layered on top of that is a communication framework that is uniquely designed around communication of data science algorithm 522 behavior as it flows real-time across the enterprise 530. According to some embodiments, the communication design includes parameters similar to that found in the Predictive Modeling Markup Language ("PMML") that are extended with proprietary elements related to insurance work, carrying the information inherently needed by various insurance operator roles, including advanced concerns around such things as underwriting and actuarial needs. Use of the logging system by a single component for its own behavior is naturally may also be included in the design. Note that the logging infrastructure 621 may include hardware components to monitor activity, storage devices to store electronic data records to record the activity, etc.

Self-reporting regression 627 may refer to aspects of having the data science algorithm and the supporting behaviors of the business process 500 test themselves and report any concerns to appropriate roles. Given the high level of automation of other elements, it may be possible to run the system against a body of test data and determine if there are areas of concern. In particular, the algorithm self-monitoring 524 and algorithm alerting 525, while mainly designed for their value in the operations workflow 511, might work without modification for self-reporting regression 627. To achieve this, a sufficiently representative example (or possibly all) of the data that might be used or encountered in the operations workflow 511 could be emulated into a testing environment. The entire solution might then be configured identically, but without interrupting actual operations workflow 511. The system may be run against test data and all normally generated algorithm alerting may be monitored. According to some embodiments, a test data storage element 1480 such as the one illustrated in FIG. 14 may be used to facilitate self-reporting regression 627.

Data security and/or commend intercepts 623 may refer to aspects of data security design forced to change to handle the nature of self-service in real-time (or in substantially real-time). To achieve self-service in real-time, it may be necessary to give the data scientist 501 an above-average level of system control. However, to meet the legal, compliance, privacy, and information protection a more fine grain and rapid audition process might be in place. Such a data security design might inherently require use of the logging infrastructure 621. That logging infrastructure 621 may be, for example, connected to an alerting process that goes directly to an operations team who maintains a set of rules for what is (and is not) allowed by the data scientists 501. The operations team can then contact the data scientist 501 to investigate or get the action reversed, or the operations team can directly alter the system to bring it back to a secure state.

Command intercepts 623 may refer to aspects of getting the logging, audition, and security actions down to the finest needed grain. Potentially risky commands may be logged in real-time to a centralized server that is not under the control of the data scientist 501 or the insurance operator 502. This ensures that every potentially risky action is known, and such knowledge cannot be altered by the user. Examples of such command intercepts 623 include controlling the PROMPT_COMMAND, inserting operating system shims to intercept application communications, etc. Such command intercepts 623 may be a low as individual keystrokes or a more course grain, such as connecting and disconnection from an application (if the courser grain is all that is required). The command intercepts 623 might be implemented in hardware, software, or a combination of hardware and software devices.

Reusable components 624 may refer to aspects of the system and method produced by either the data scientist 501 or the technology engineer 601 as part of the implementation of either the business process 500 or technical architecture 600 that can be modularized, stored in a library, uniquely identified and/or described, and then reused again in future solutions. The method may include the publication of standardized practices that ensure the reusability in future context. A process may be established to allow the data scientist 501 and technology engineer 601 to continually contribute the library in a manner that allows its continued manageability as it grows. The process might also allow such reuse to occur in the future with other personnel who are in the same roles. The reusable components 624 could be stored as a searchable library of electronic files in a central repository 1470 (such as the one illustrated in FIG. 14).

Automated source control 625 may refer to aspects of providing a mechanism to automatically source control all elements of the reusable components as part of the algorithm deployment 523 so that the corporate intellectual property that is inherent in the data science algorithm 522 is protected without the need for explicit action by any person an either role. For data science algorithms 522 that are of sufficient value to the organization, the path from the data science workflow 510 to operations workflow 511 may be gated in such a way that the only path to the operations workflow 511 is through the automated source control 625 process, thus forcing protection of the corporate intellectual property in a means typically required of financial services and insurance companies.

Algorithm boundary detection 626 may refer to aspects of the data science algorithm 522 that notify staff that it has crossed some defined thresholds and may need intervention from an appropriate role. Such boundary conditions (e.g., maximum values, minimum values, a series of values over a period of time, etc.) might be built into the algorithm control 521 aspects of the solution to both facilitate and leverage the algorithm. According to some embodiments, self-reporting regression 627 may refer to aspects of the system that makes sure it works with test data (e.g., to see if any boundaries are triggered). According to some embodiments, a back-end application computer server executing a predictive analytic algorithm may facilitate the algorithm boundary detection 626 (e.g., by having the algorithm itself monitor its own results and/or the results of other algorithms).

Figure 7:
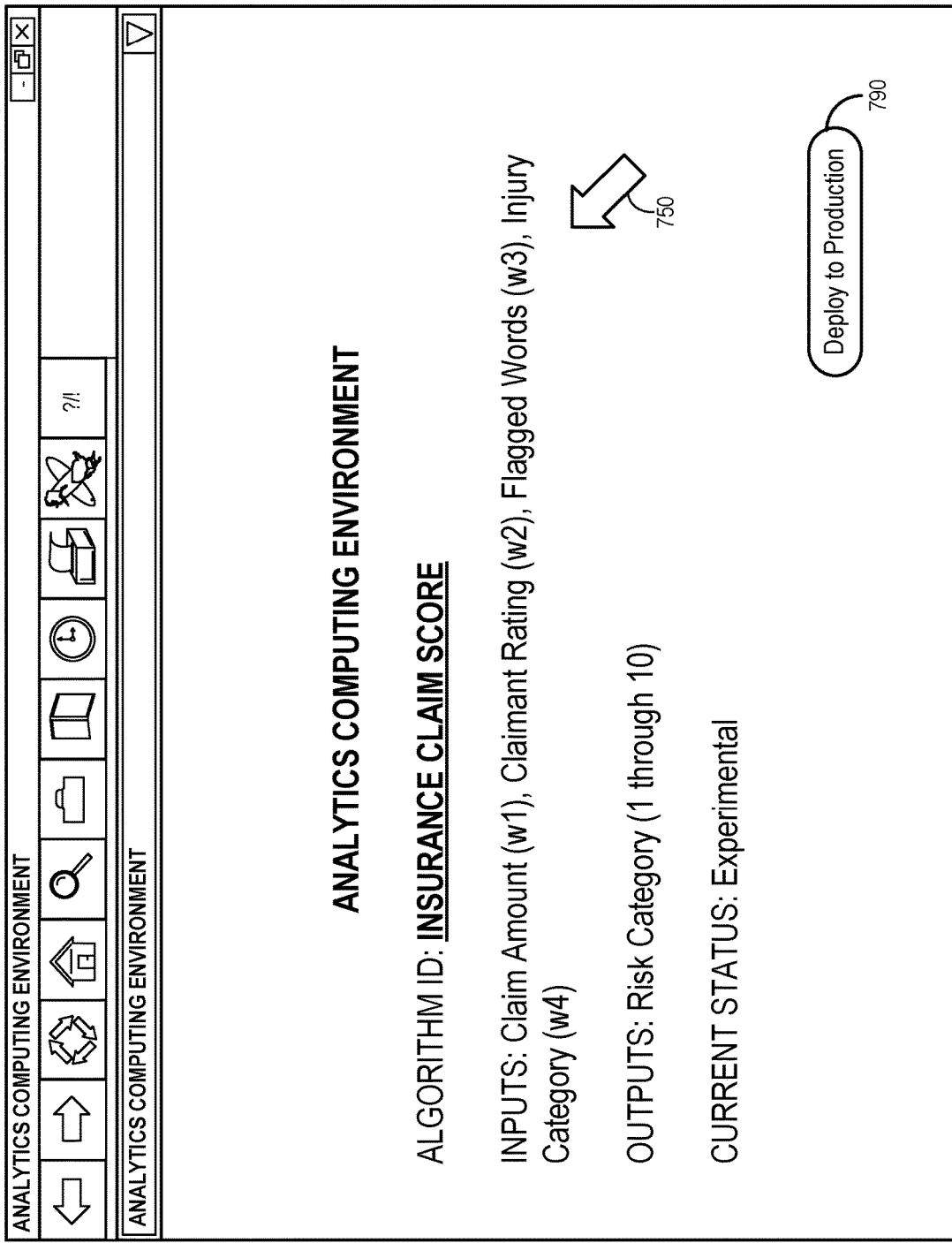
FIG. 7 illustrates an analytics computing environment interactive user display in accordance with some embodiments.

FIG. 7 illustrates an analytics computing environment interactive user display 700 in accordance with some embodiments. The display 700 might be used, for example, by a data scientist who is creating and/or testing a predictive analytic algorithm. The display 700 includes information about the algorithm, such as an algorithm identifier or name and a set of characteristic values (e.g., inputs and associated weighting factors, outputs, business logic or rules, status, etc.). According to some embodiments, the user can operate a computer pointer 750 to receive more information about the algorithm, adjust characteristic values, etc. A "deploy to production" 790 icon might be selectable by the user to "promote" the algorithm to a business operations workflow.

Figure 8:
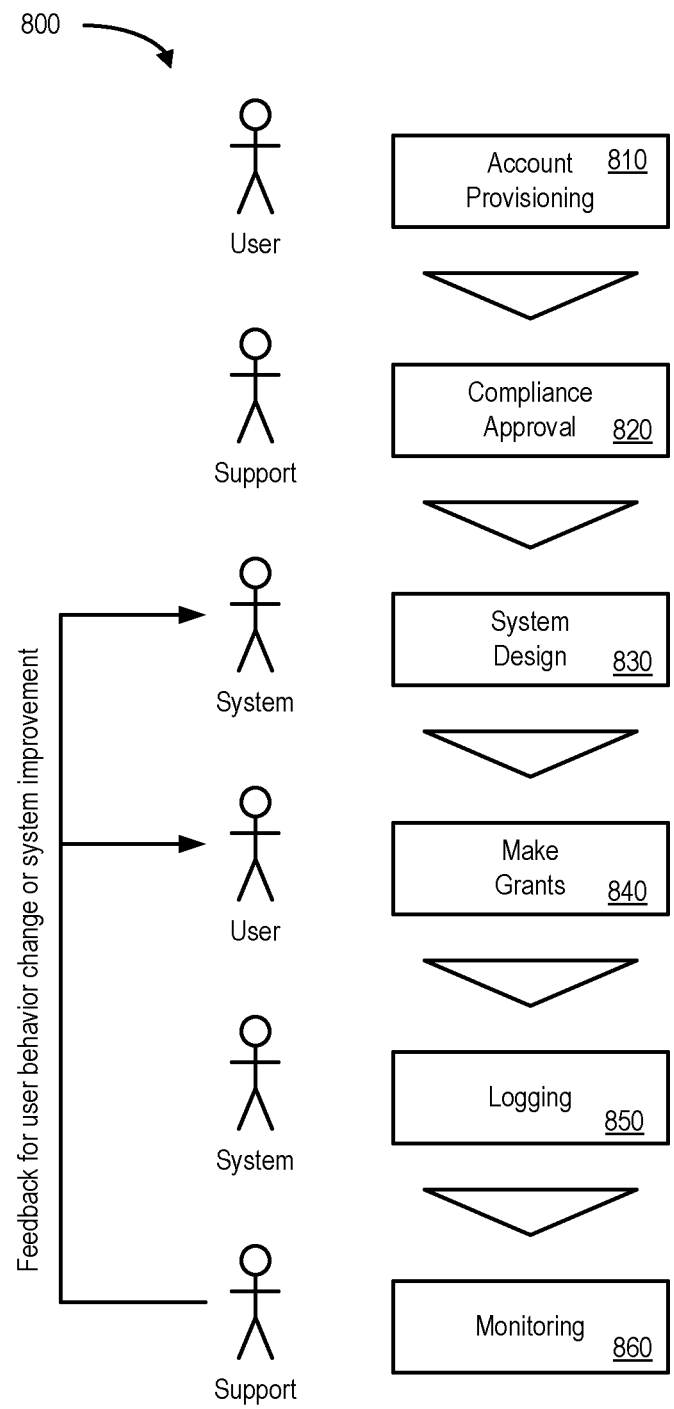
FIG. 8 is a system flow diagram according to some embodiments.

FIG. 8 is a system flow diagram 800 according to some embodiments. At 810, a user may have an account provisioned for his or her use in the analytics environment. At 820, support staff may help the user get approval for the use of needed data sets in the environment. Note that this portion of the process is about the data (and not the environment). According to some embodiments, recurring cases can have a pattern of approval. At 830, the system may be designed to keep data secure for the analytics user. For example, events such as users connecting automatically may execute security standards. According to some embodiments, the design is certified at the environment level. At 840, the user is trusted to make grants within the bounds of his or her role or job. The user may have primary accountability for his or her actions. At 850, the system may perform extremely fine-grained logging of any user events that involve data access. Note that it might not be feasible to categorize some actions as either "good" or "bad" (in which case the actions may just be logged by the system). At 860, support staff may monitor data access logging to find inappropriate actions. Based on findings, users are may be asked to change behavior (and the system design may be continually enhanced). Note that this monitoring may be provided as feedback to both the analytics user and the people within the enterprise who are responsible for the overall system.

Figure 9:
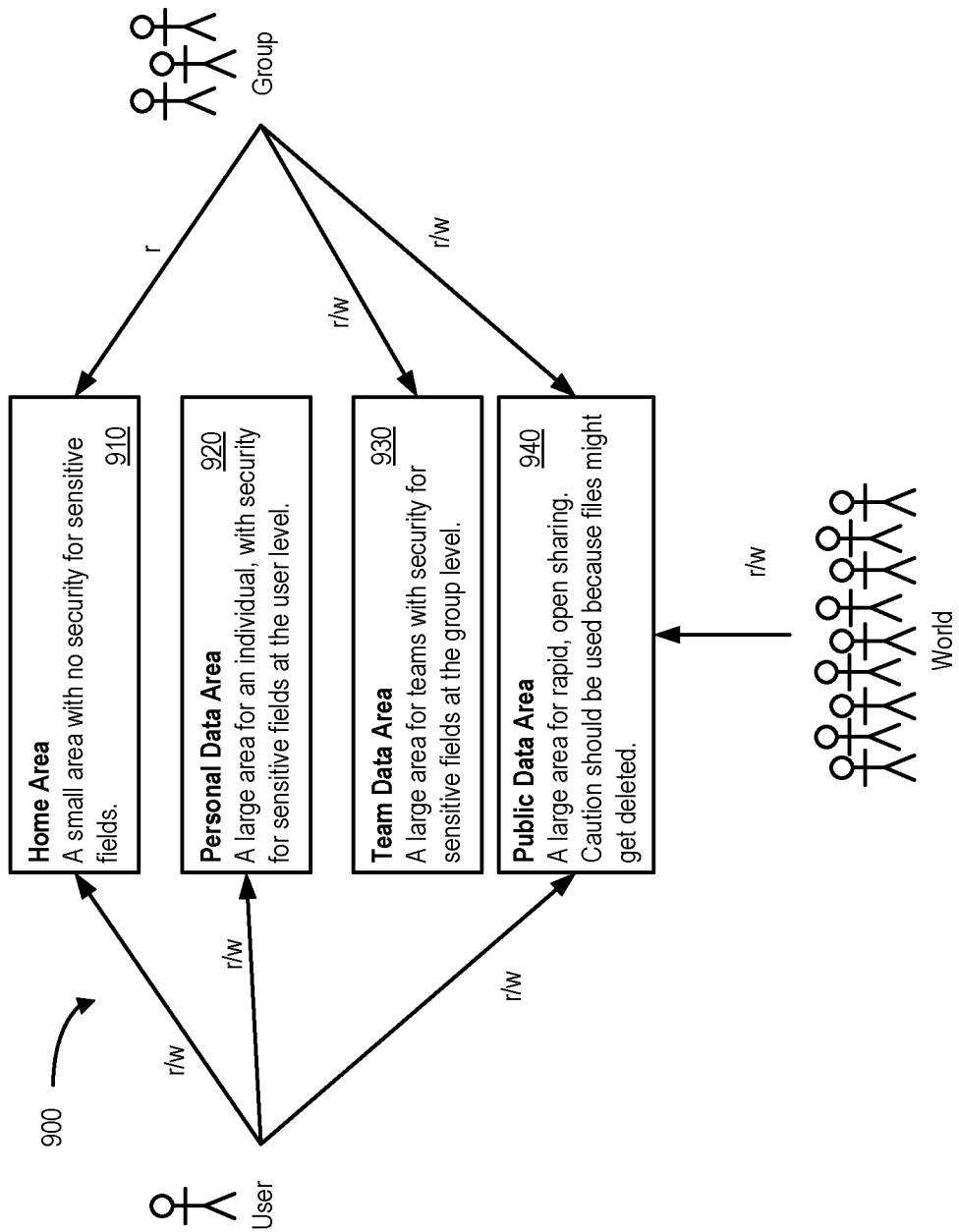
FIG. 9 is an access map that might be provided in accordance with some embodiments.

FIG. 9 is an access map 900 that might be provided in accordance with some embodiments. A home area 910 may be relative small area with no security for sensitive fields. The home area 910 might provide read and write access for a user and read access for a group. A personal data area 920 may be a large area for a user individually, with security for sensitive fields at a user level. The personal data area 920 might provide read and write access for a user (and no access for a group). A team data area 930 may be large area for teams with security for sensitive fields at the group level. The team data area 930 might provide read and write access for a group (and no access for an individual user). A public data area 940 might comprise a large area for rapid, open sharing. Caution might be used in the public data area because files might be deleted (that is, read and write access may be given to a user, a group and the world at large).

Figure 10:
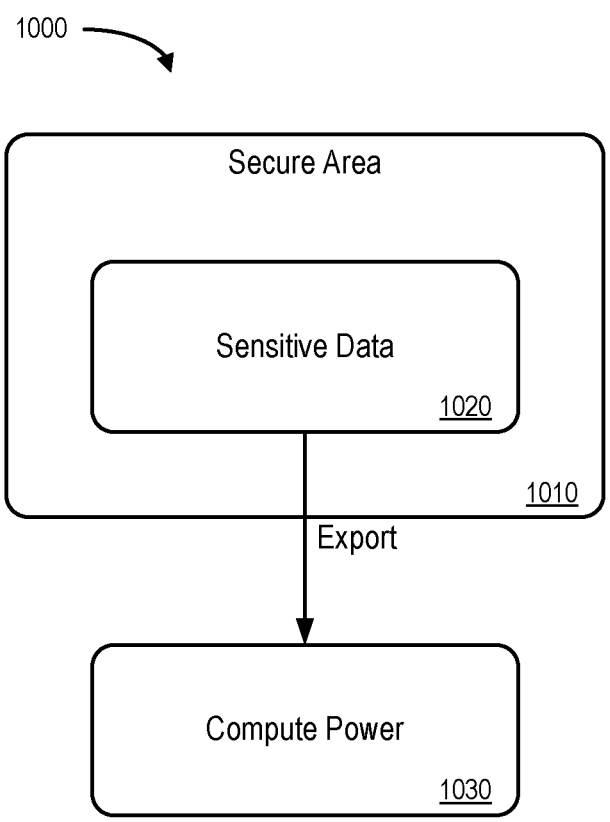
FIG. 10 illustrates a first approach to secure data according to some embodiments.
Figure 11:
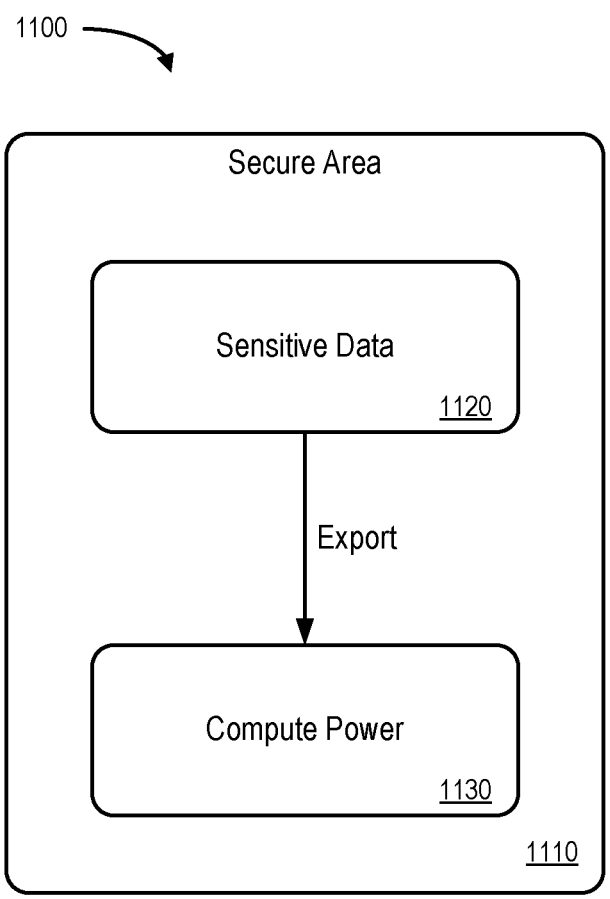
FIG. 11 illustrates a second approach to secure data in accordance with some embodiments.

FIG. 10 illustrates a first approach 1000 to secure data according to some embodiments. In this approach 1000, sensitive data 1020 is stored within a secure area 1010. The sensitive data 1020 may be exported to compute power 1030 outside the secure area 1010. In this case, however, users may gravitate to compute power 1030 and bring along data. Such behavior can be difficult to control without reducing productivity. Moreover, many tools have an export function and monitoring the use of such functions can be impractical. To avoid such problems, FIG. 11 illustrates a second ("walled garden") approach 1100 to secure data in accordance with some embodiments. As before, sensitive data 1120 is stored within a secure area 1110. The sensitive data 1120 may be exported to compute power 1130 that is also inside the secure area 1110. That is, after bringing the compute power 1130 within the secure area 1110, the enterprise may let users export information without consequence.

Figure 12:
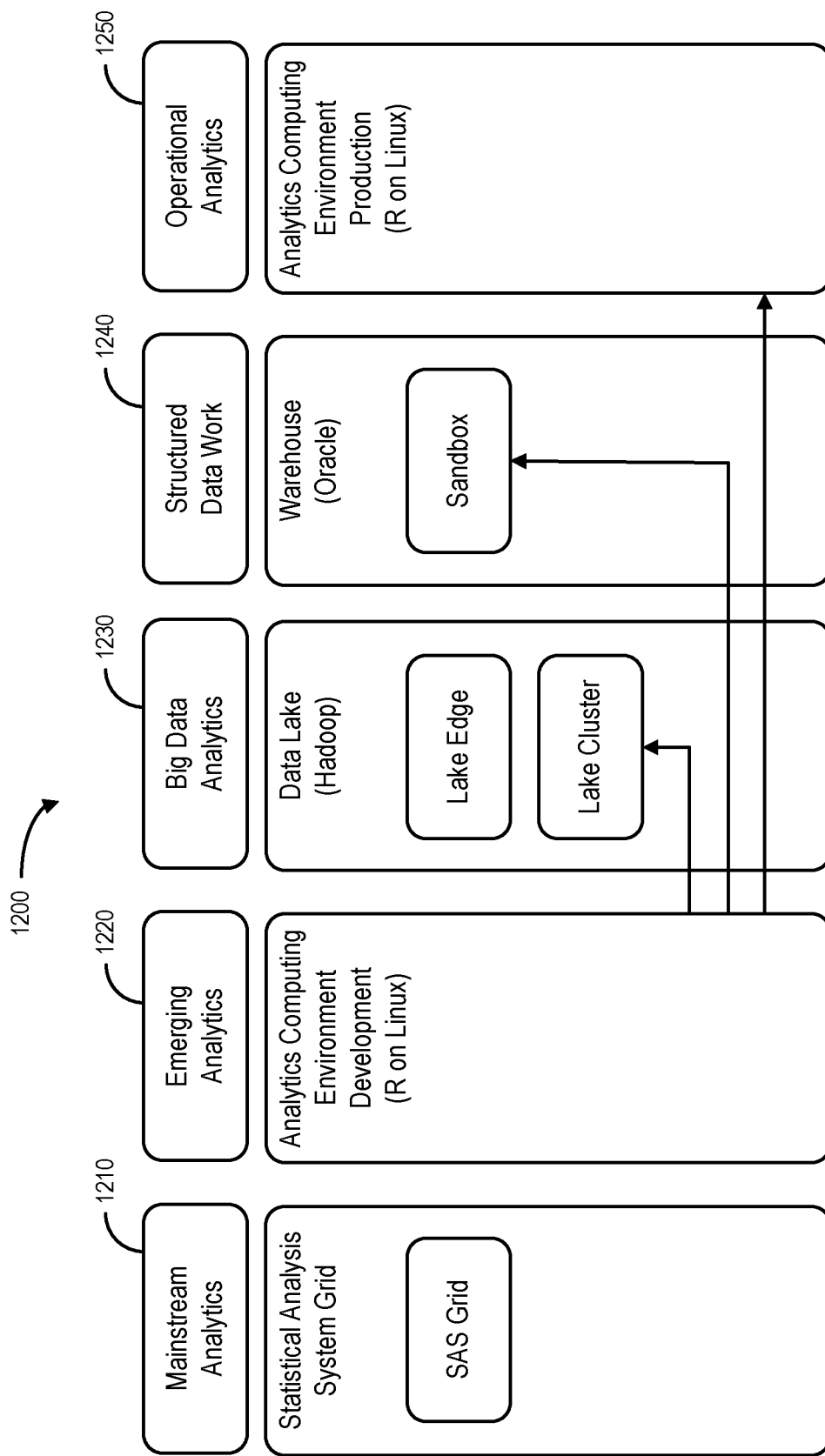
FIG. 12 is an example of a server map including compute and storage areas according to some embodiments.

FIG. 12 is an example of a server map 1200 including compute and storage areas according to some embodiments. A mainstream analytics portion 1210 may be associated with, for example, a Statistical Analysis System ("SAS") grid. An emerging analytics portion 1220 may be associated with an analytics computing environment for development (such as one implemented via the language R on a Linux operating system). A big data analytics portion 1230 may be associated with a data lake (e.g. in accordance with Hadoop), a lake edge, a lake cluster, etc. A structured data work portion 1240 may be associated with a data warehouse and/or a sandbox. An operational analytics portion 1250 may be associated with an analytics computing environment for production (such as one implemented via the language R on a Linux operating system). According to some embodiments, the emerging analytics portion 1220 may do big data operations on the big data analytics portion 1230, use traditional data on the structured data work portion, and/or deploy to operations via the operational analytics portions 1250.

Figure 13:
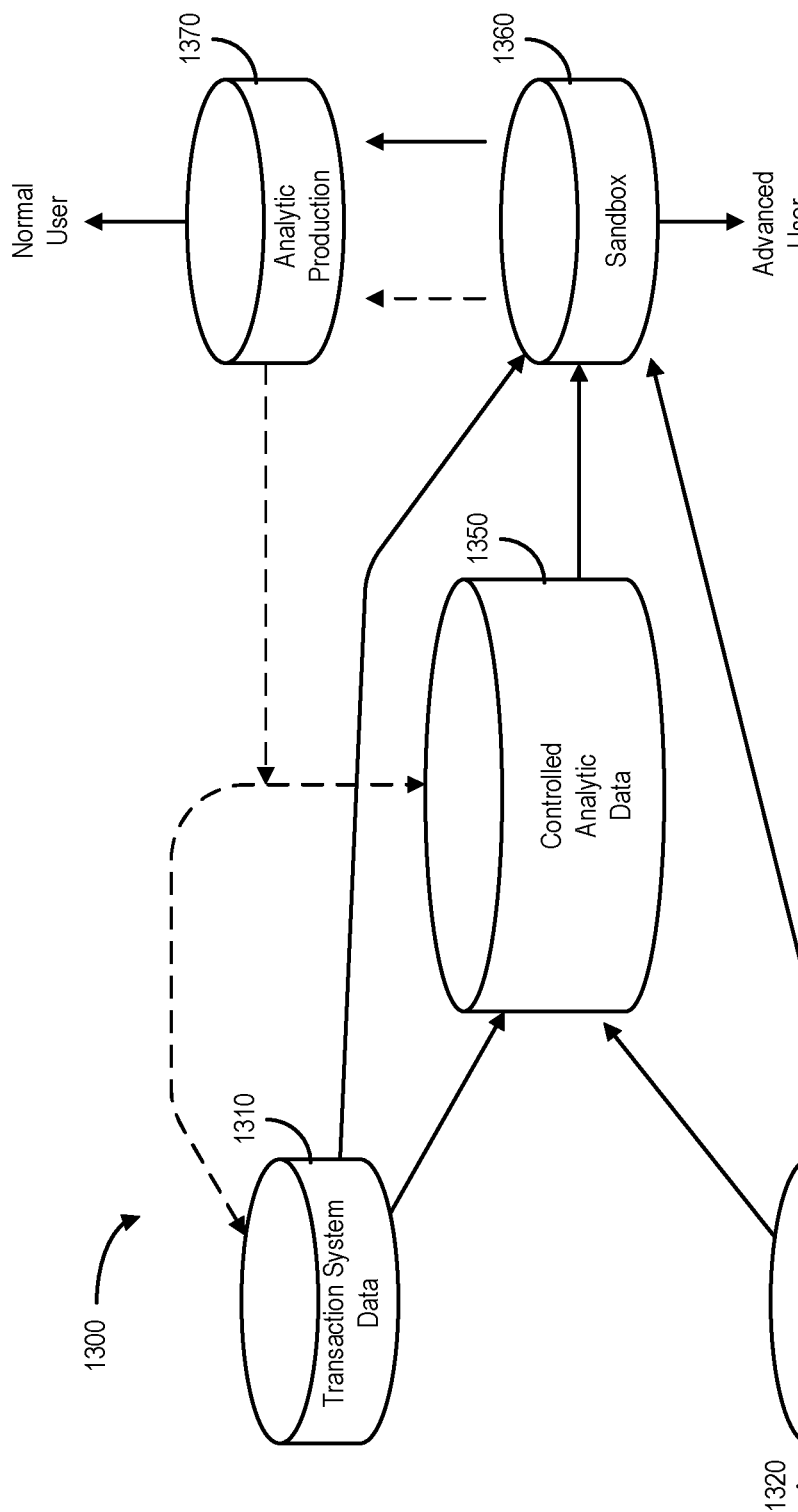
FIG. 13 is an information flow diagram associated with a promotion from analytics to production in accordance with some embodiments.

FIG. 13 is an information flow diagram 1300 associated with a promotion from analytics to production in accordance with some embodiments. A controlled analytic data store 1350 may receive data from a transaction system data store 1310 (e.g., containing production data) along with other data 1320 (as illustrated by solid arrows in FIG. 13). All of the transaction system data store 1310, other data 1320, and the controlled analytic data store may provide data to a sandbox 1360 (e.g., by "publishing" the data) that can be accessed by an advanced user. Information may, when appropriate, by moved from the sandbox 1350 to analytics production 1370 for access by normal users. Note that code may also be transmitted from the sandbox 1360 to the analytic production 1370 and from analytic production 1370 to either the transaction system data store 1310 or the controlled analytic data store 1350 (as illustrated by dashed arrows in FIG. 13).

Figure 14:
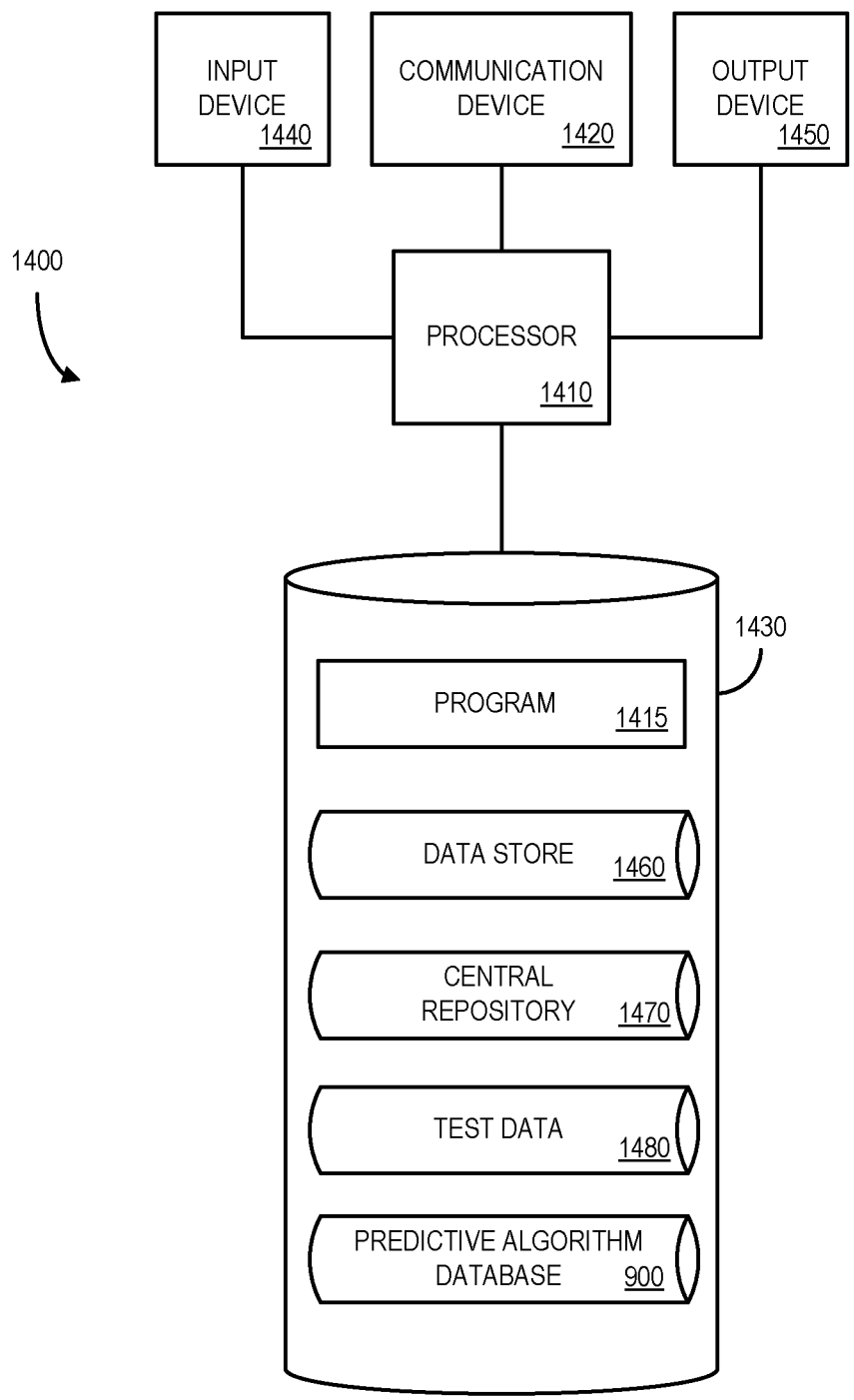
FIG. 14 is a block diagram of an apparatus in accordance with some embodiments of the present invention.

The embodiments described herein may be implemented using any number of different hardware configurations. For example, FIG. 14 illustrates an automated algorithm deployment system 1400 that may be, for example, associated with the system 100 of FIG. 1. The automated algorithm deployment system 1400 comprises a processor 1410, such as one or more commercially available Central Processing Units ("CPUs") in the form of one-chip microprocessors, coupled to a communication device 1420 configured to communicate via a communication network (not shown in FIG. 14). The communication device 1420 may be used to communicate, for example, with one or more remote user terminals, data stores, and/or or other communication devices (e.g., PCs and smartphones). Note that communications exchanged via the communication device 1420 may utilize security features, such as those between a public internet user and an internal network of the insurance enterprise. The security features might be associated with, for example, web servers, firewalls, and/or PCI infrastructure. The automated algorithm deployment system 1400 further includes an input device 1440 (e.g., a mouse and/or keyboard to enter information about algorithms, hardware resources, inputs, outputs, etc.) and an output device 1450 (e.g., to output reports regarding system administration, results, current algorithm statuses, etc.).

The processor 1410 also communicates with a storage device 1430. The storage device 1430 may comprise any appropriate information storage device, including combinations of magnetic storage devices (e.g., a hard disk drive), optical storage devices, mobile telephones, and/or semiconductor memory devices. The storage device 1430 stores a program 1415 and/or a risk relationship management engine or application for controlling the processor 1410. The processor 1410 performs instructions of the program 1415, and thereby operates in accordance with any of the embodiments described herein. For example, the processor 1410 may receive a set of electronic data records, each electronic data record being associated with a predictive analytic algorithm and including an algorithm identifier and a set of algorithm characteristic values. The processor 1410 may then receive an adjustment from a user associated with an enterprise, the adjustment changing at least one of the set of algorithm characteristic values for a predictive analytic algorithm. Deployment of the predictive analytic algorithm may then be initiated by the processor 1410 and at least one result may be generated. The at least one result might then be used by the processor 1410 to automatically adjust at least one operating parameter of the deployed predictive analytic algorithm. According to some embodiments, the deployed predictive analytic algorithm may monitor the result (or a series of results) and generate an alert signal when the result exceeds a boundary condition.

The program 1415 may be stored in a compressed, uncompiled and/or encrypted format. The program 1415 may furthermore include other program elements, such as an operating system, a database management system, and/or device drivers used by the processor 1410 to interface with peripheral devices.

As used herein, information may be "received" by or "transmitted" to, for example: (i) the automated algorithm deployment system 1400 from another device; or (ii) a software application or module within the automated algorithm deployment system 1400 from another software application, module, or any other source.

In some embodiments (such as shown in FIG. 14), the storage device 830 further stores a computer data store 1460 (e.g., storing predictive analytic algorithms), a central repository 1470 (e.g., storing algorithm results), test data 1480, and a predictive algorithm database 1500. An example of a database that might be used in connection with the automated algorithm deployment system 1400 will now be described in detail with respect to FIG. 15. Note that the database described herein is only an example, and additional and/or different information may be stored therein. Moreover, various databases might be split or combined in accordance with any of the embodiments described herein. For example, the computer data store 1460 and/or predictive algorithm database 1500 might be combined and/or linked to each other within the program 1415.

Figure 15:
FIG. 15 is a portion of a tabular predictive analytic algorithm database in accordance with some embodiments.

Referring to FIG. 15, a table is shown that represents the predictive algorithm database 1500 that may be stored at the automated algorithm deployment system 1400 according to some embodiments. The table may include, for example, entries associated with business rules or logic created by a data scientist. The table may also define fields 1502, 1504, 1506, 1508, 1510 for each of the entries. The fields 1502, 1504, 1506, 1508, 15010 may, according to some embodiments, specify: a predictive algorithm identifier 1502, a data scientist identifier 1504, inputs 1506, outputs 1508, a status 1510, and alerts 1512. The predictive algorithm database 1500 may be created and updated, for example, based on information electrically received from a data scientist, an algorithm, test data, a production environment, etc.

The predictive algorithm identifier 1502 may be, for example, a unique alphanumeric code identifying a predictive analytic algorithm that has been created by a data scientist associated with the data scientist identifier 1504. The inputs 1506 and outputs 1508 might define the data that is consumed and produced by the algorithm, respectively. Note that according to some embodiments, the inputs 1506 might include weighted values (e.g., w1, w2, etc.) that can be used to indicate that some parameters have more predictive value as compared to other parameters. That status 1510 might indicate, for example, that an algorithm is experimental, in production, etc. The alerts 1512 might indicate that a boundary value has been tripped, that an alert message has been automatically transmitted by an algorithm, etc.

Figure 16:
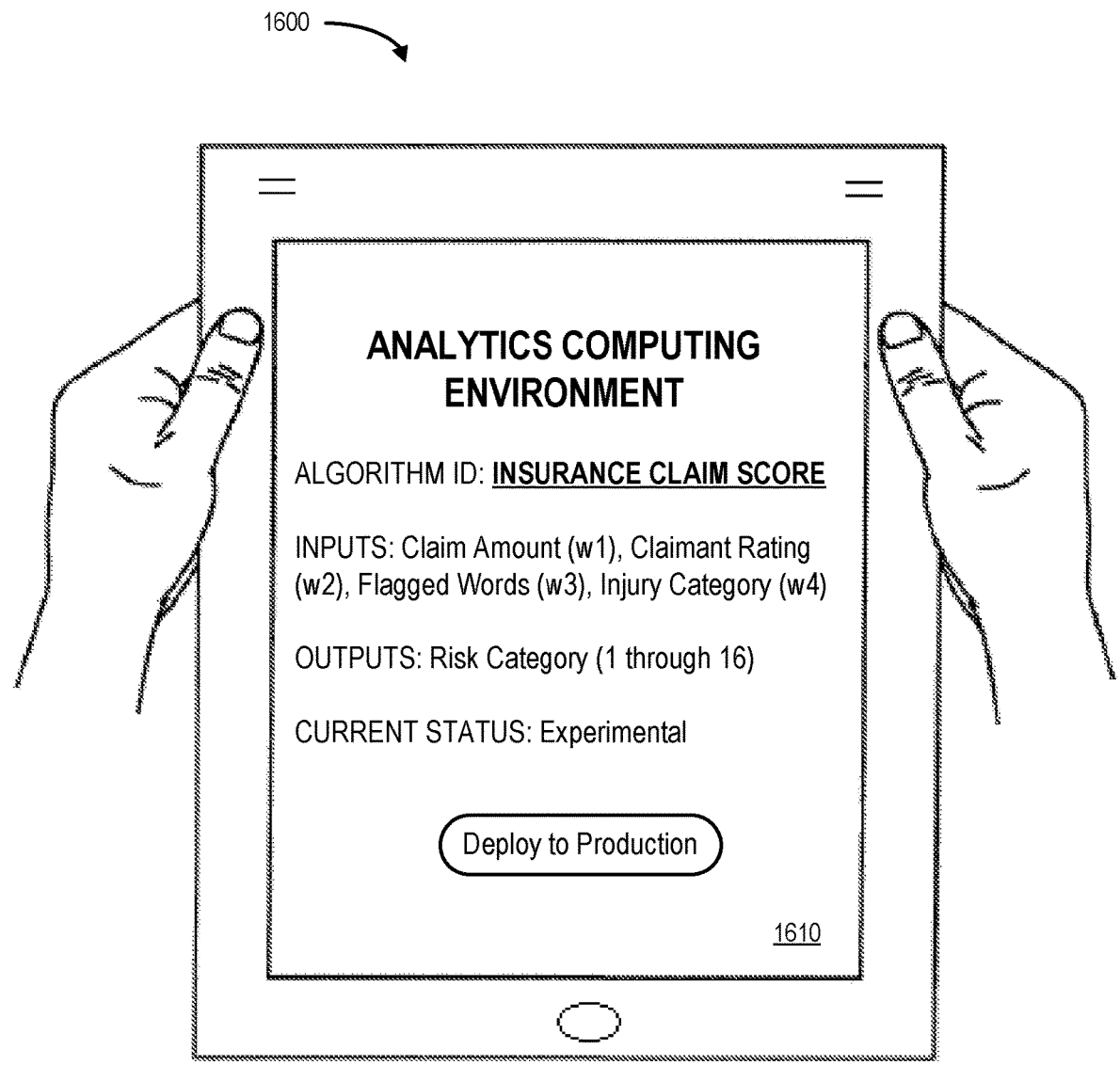
FIG. 16 illustrates a tablet computer displaying an algorithm deployment user interface according to some embodiments.

Although specific hardware and data configurations have been described herein, note that any number of other configurations may be provided in accordance with embodiments of the present invention (e.g., some of the databases described herein may be combined or stored in external systems). Similarly, although a certain number of computing components were provided in connection with some embodiments described herein, other numbers of components (and different types of components) might be used instead. Still further, the displays and devices illustrated herein are only provided as examples, and embodiments may be associated with any other types of user interfaces. For example, FIG. 16 illustrates a handheld tablet computer 1000 displaying an algorithm deployment display 1610 according to some embodiments. The algorithm deployment display 1610 might include various predictive analytic algorithm parameters (characteristic values) that can be selected and/or modified by a user of the handheld computer 1600 (e.g., to see additional information, define a new algorithm to be created, adjust an existing algorithm parameter, etc.).

Figure 17:
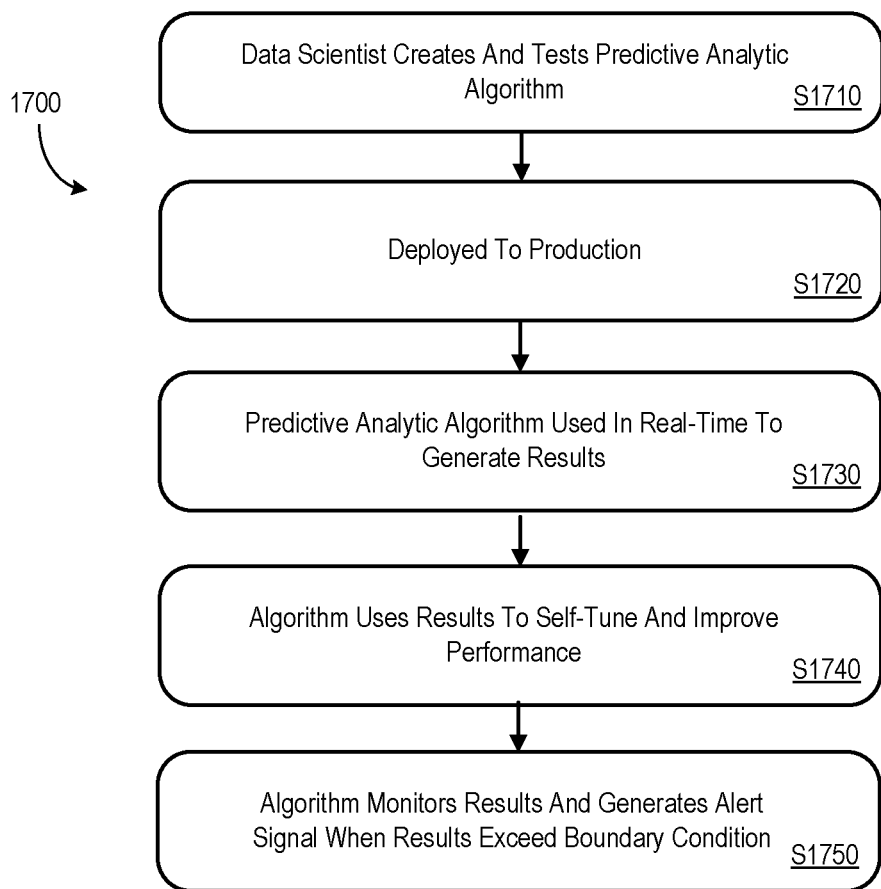
FIG. 17 is an example of automated algorithm deployment for an enterprise in accordance with some embodiments.

Although embodiments have been described with respect to specific types of enterprises, embodiments may be utilized in many different enterprise workflows. For example, FIG. 17 is an example of an automated algorithm deployment process 1700 for an enterprise in accordance with some embodiments. At S1710, a data scientist may create and test a predictive analytic algorithm. For example, the data scientist might have create an algorithm that predicts how likely it is that a current customer will switch his or her business to another insurance company in the next three months. At S1720, the predictive analytic algorithm may be deployed to a production environment. That is, the predictive analytic algorithm may be used and executed in an enterprise operations workflow. At S1730, the predictive analytic algorithm may be used in substantially real-time to generate results. For example, the algorithm might execute on a daily basis to generate a list of existing customers who are likely to no renew insurance policies (and those customers might be pre-actively contacted). At S1740, the algorithm may use those results to self-tune and improve performance. For example, the algorithm might compare predicted results with actual results and adjust one or more weighing factors to improve the performance of the model. At S1750, the algorithm may monitor the results and generate an alert signal when the results exceed a boundary condition.

Thus, embodiments may enable data science practitioners in an enterprise, such as an insurance company, to create and deploy predictive algorithms into operational business workflows at an enterprise scale in a manner that allows real-time understanding and tuning of predictive analytics to drive business operations.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to facilitate predictive analytics for an insurance enterprise, comprising:
   (a) an analytics computing environment data store containing a set of electronic data records, each electronic data record being associated with a predictive analytic algorithm and including an algorithm identifier and a set of algorithm characteristic values, wherein: (i) an experimental predictive analytic algorithm may be promoted to an underwriting production predictive analytic algorithm, and (ii) an underwriting production predictive analytic algorithm may be demoted to an experimental predictive analytic algorithm;
   (b) an analytics environment computer, coupled to the coupled to the analytics computing environment data store, programmed to:
      (i) receive an adjustment from a user associated with the insurance enterprise, the adjustment changing at least one of the set of algorithm characteristic values for a predictive analytic algorithm, and
      (ii) initiate deployment of the predictive analytic algorithm in an enterprise operations workflow; and
   (c) an enterprise operations workflow computer, coupled to the analytics environment computer, programmed to:
      (i) receive the deployment initiation from the analytics environment computer, and
      (ii) execute an operations workflow in association with the deployed predictive analytic algorithm to generate at least one result, wherein the predictive analytic algorithm stores its own output as an input, allowing for self-tuning while deployed in the enterprise operations workflow computer,
   wherein the deployed predictive analytic algorithm is to monitor the result and generate an alert signal when the result exceeds a boundary condition, and the alert is further to automatically promote or demote the predictive analytic algorithm as appropriate.

2. The system of claim 1, wherein the predictive analytic algorithm is associated with a data science algorithm and at least one of the analytics environment computer and the enterprise operations workflow computer are designed to let the data science algorithm to be moved directly to the operations workflow and operate with a level of rigor and reliability associated with the operations workflow.

3. The system of claim 2, wherein movement of the data science algorithm from the analytics computing environment data store to the operations workflow is performed automatically via system components created for data scientist users.

4. The system of claim 2, wherein use of the data science algorithm is embedded directly in the operations workflow while simultaneously keeping control of the data science algorithm in a platform associated with an analytics environment computer.

5. The system of claim 2, wherein components of the system allow for both current underwriting production data science algorithms and current experimental data science algorithms to function in parallel without conflict.

6. The system of claim 1, wherein system components are constructed with environmental uniformity, reducing overhead associated with movement of system components between the analytics environment computer and the enterprise operations workflow computer.

7. The system of claim 1, wherein users of the system are configured with environmental uniformity, improving user productivity.

8. The system of claim 1, wherein actions by the user are monitored, captured, and reported to achieve a level of legal, privacy, and policy compliance commensurate with a sensitivity of data being processed.

9. The system of claim 1, wherein predictive analytic algorithm monitors and checks its own behavior and provides indicators of its own behavior capable of being transmitted to both the user and other systems in the insurance enterprise.

10. The system of claim 1, wherein the predictive analytic algorithm has boundary and error conditions, such that the algorithm will connect to an enterprise logging infrastructure to notify appropriate parties when the algorithm moves outside the boundary condition.

11. The system of claim 1, wherein a library of reusable components is maintained consistent across data science, operations, current production release, and experimental levels to facilitate movement of data science functionality among the various regions of the insurance enterprise.

12. The system of claim 1, wherein a model can execute against a regression test base and report a health value as compared to prior baselines.

13. The system of claim 1, wherein deployment of the predictive analytic algorithm is a self-service process performed by a data scientist in substantially real-time.

14. A computerized method to automate algorithm deployment for an insurance enterprise, comprising:

receiving, by an analytics environment computer, data from an analytics computing environment data store containing a set of electronic data records, each electronic data record being associated with a predictive analytic algorithm and including an algorithm identifier and a set of algorithm characteristic values, wherein: (i) an experimental predictive analytic algorithm may be promoted to an underwriting production predictive analytic algorithm, and (ii) an underwriting production predictive analytic algorithm may be demoted to an experimental predictive analytic algorithm;

receiving an adjustment from a user associated with the enterprise, the adjustment changing at least one of the set of algorithm characteristic values for a predictive analytic algorithm;

initiating deployment of the predictive analytic algorithm in an enterprise operations workflow; and executing, by an enterprise operations workflow computer, an operations workflow in association with the deployed predictive analytic algorithm to generate at least one result, wherein the predictive analytic algorithm stores its own output as an input, allowing for self-tuning while deployed in the enterprise operations workflow computer, wherein the deployed predictive analytic algorithm is to monitor the result and generate an alert signal when the result exceeds a boundary condition, and the alert is further to automatically promote or demote the predictive analytic algorithm as appropriate.

15. A system to facilitate predictive analytics for an insurance enterprise, comprising:

(a) an analytics computing environment data store containing a set of electronic data records, each electronic data record being associated with a predictive analytic algorithm and including an algorithm identifier and a set of algorithm characteristic values, wherein: (i) an experimental predictive analytic algorithm may be promoted to an underwriting production predictive analytic algorithm, and (ii) an underwriting production predictive analytic algorithm may be demoted to an experimental predictive analytic algorithm;

(b) an analytics environment computer, coupled to the coupled to the analytics computing environment data store, programmed to:
  (i) receive an adjustment from a user associated with the insurance enterprise, the adjustment changing at least one of the set of algorithm characteristic values for a predictive analytic algorithm, and
  (ii) initiate deployment of the predictive analytic algorithm in an enterprise operations workflow;

(c) an enterprise operations workflow computer, coupled to the analytics environment computer, programmed to:
  (i) receive the deployment initiation from the analytics environment computer, and
  (ii) execute an operations workflow in association with the deployed predictive analytic algorithm to generate at least one result, wherein the predictive analytic algorithm stores its own output as an input, allowing for self-tuning while deployed in the enterprise operations workflow computer, wherein the deployed predictive analytic algorithm is to monitor the result and generate an alert signal when the result exceeds a boundary condition, and the alert is further to automatically promote or demote the predictive analytic algorithm as appropriate;

(d) a central repository to store results generated by the predictive analytic algorithm; and (e) a communication port coupled to the analytics environment computer to facilitate an exchange of electronic messages, via a distributed cloud-based communication network, to present an interactive graphical user interface at a remote terminal associated with the user.

16. The system of claim 15, wherein predictive analytic algorithm monitors and checks its own behavior and provides indicators of its own behavior capable of being transmitted to both the user and other systems in the enterprise.

* * * * *